United States Patent
Hsiao et al.

(10) Patent No.: US 10,135,348 B2
(45) Date of Patent: Nov. 20, 2018

(54) LLC POWER CONVERTER AND SWITCHING METHOD THEREOF

(71) Applicant: Infineon Technologies Austria AG, Villach (AT)

(72) Inventors: Anderson Hsiao, Taipei (TW); Gary Chang, New Taipei (TW); Lawrence Lin, Taipei (TW)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 71 days.

(21) Appl. No.: 15/154,689

(22) Filed: May 13, 2016

(65) Prior Publication Data

US 2017/0331383 A1 Nov. 16, 2017

(51) Int. Cl.
*H02M 3/335* (2006.01)
*H02M 1/08* (2006.01)
*H02M 1/00* (2006.01)

(52) U.S. Cl.
CPC ... *H02M 3/33546* (2013.01); *H02M 3/33569* (2013.01); *H02M 2001/0022* (2013.01); *H02M 2001/0058* (2013.01)

(58) Field of Classification Search
CPC ......... H02M 3/33546; H02M 3/33507; H02M 3/33569; H02M 3/335–3/3378; H02M 2007/4815; Y02B 70/1433; Y02B 70/1441

See application file for complete search history.

(56) References Cited

U.S. PATENT DOCUMENTS

| | | | | |
|---|---|---|---|---|
| 5,430,633 | A * | 7/1995 | Smith | H02M 3/33569 363/131 |
| 8,773,869 | B2 * | 7/2014 | Khan | H02M 7/217 363/16 |
| 2013/0194831 | A1 | 8/2013 | Hu | |
| 2014/0247626 | A1 | 9/2014 | Lee | |
| 2015/0049525 | A1 * | 2/2015 | Mu | H02M 7/53871 363/37 |
| 2016/0342182 | A1 * | 11/2016 | Deboy | H02M 3/33507 |
| 2017/0054378 | A1 * | 2/2017 | Njiende T. | H01F 27/2823 |

* cited by examiner

*Primary Examiner* — Nguyen Tran
*Assistant Examiner* — Monica Mata
(74) *Attorney, Agent, or Firm* — Slater Matsil, LLP

(57) ABSTRACT

In some embodiments, an inductor-inductor-capacitor (LLC) converter includes a transformer having a primary winding, a secondary winding, and an auxiliary winding. The primary winding is coupled to a primary side circuit and the auxiliary winding has a first winding portion coupled between a first terminal and a middle terminal, and a second winding portion coupled between the middle terminal and a second terminal. The LLC converter further includes a first diode coupled between the first terminal and a first node, a second diode coupled between the second terminal and the first node, and a switch coupled between the first node and a reference voltage terminal. The middle terminal of the auxiliary winding is coupled to the reference voltage terminal.

32 Claims, 13 Drawing Sheets

2000

Detecting that an input voltage to an inductor-inductor-capacitor (LLC) converter is below a pre-determined threshold, the LLC converter comprising
　　a transformer comprising a primary winding, a secondary winding and an auxiliary winding;
　　　　a first diode and a second diode, wherein a first terminal coupled to a first end of the auxiliary winding and a second terminal coupled to a second end of the auxiliary winding are coupled to a first node via the first diode and the second diode, respectively, wherein a third terminal of the auxiliary winding between the first terminal and the second terminal is coupled to a reference terminal; and
　　　　a first switch coupled between the first node and the reference terminal;
the method comprising

2010 closing the first switch to couple the first node to the reference terminal upon the detecting

LLC POWER CONVERTER AND SWITCHING METHOD THEREOF

TECHNICAL FIELD

An embodiment of the invention relates generally to electronic power conversion and methods, and more particularly to the structure and switching method for an inductor-inductor-capacitor (LLC) converter.

BACKGROUND

Switching converters are widely used in the field of power conversion. A switching converter includes at least one switch that is configured to generate a pulse-width modulated (PWM) voltage from an input voltage, and a rectifier arrangement that receives the PWM voltage and generates an output voltage to be supplied to a load. Usually the rectifier arrangement includes at least one inductive storage element, such as a choke, and at least one capacitive storage element, such as a capacitor. The PWM voltage is generated by switching the switching element on and off in accordance with a PWM drive signal. The PWM drive signal is provided by a controller dependent on the output voltage. The controller is configured to vary, e.g., the switching frequency of the PWM drive signal in order to maintain a desired output voltage.

LLC converters, sometimes referred to as resonant LLC converters or LLC power converters, have been widely used recently due to desirable features such as high efficiency, low electro-magnetic interference (EMI), and high power density. A characteristic feature of an LLC converter is a resonant circuit on the primary side of the converter that includes a resonant capacitor, a resonant inductor, and the magnetizing inductance of the transformer. During operation, the amount of energy transferred by the LLC converter may be controlled by controlling the switching frequency at or about the resonant frequency of the resonant circuit.

SUMMARY OF THE INVENTION

In accordance with an embodiment, an inductor-inductor-capacitor (LLC) converter includes a transformer having a primary winding, a secondary winding, and an auxiliary winding. The primary winding is coupled to a primary side circuit, and the auxiliary winding has a first winding portion coupled between a first terminal and a middle terminal, and a second winding portion coupled between the middle terminal and a second terminal. The LLC converter further includes a first diode coupled between the first terminal and a first node, a second diode coupled between the second terminal and the first node, and a switch coupled between the first node and a reference voltage terminal. The middle terminal of the auxiliary winding is coupled to the reference voltage terminal.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be redescribed in the interest of brevity. For a more complete understanding of the invention, reference is now made to the following descriptions taken in conjunction with the accompanying drawings, in which:

FIG. 11 illustrates a flow diagram for a method of operating an LLC converter.

DETAILED DESCRIPTION OF ILLUSTRATIVE EMBODIMENTS

Figure 1A:
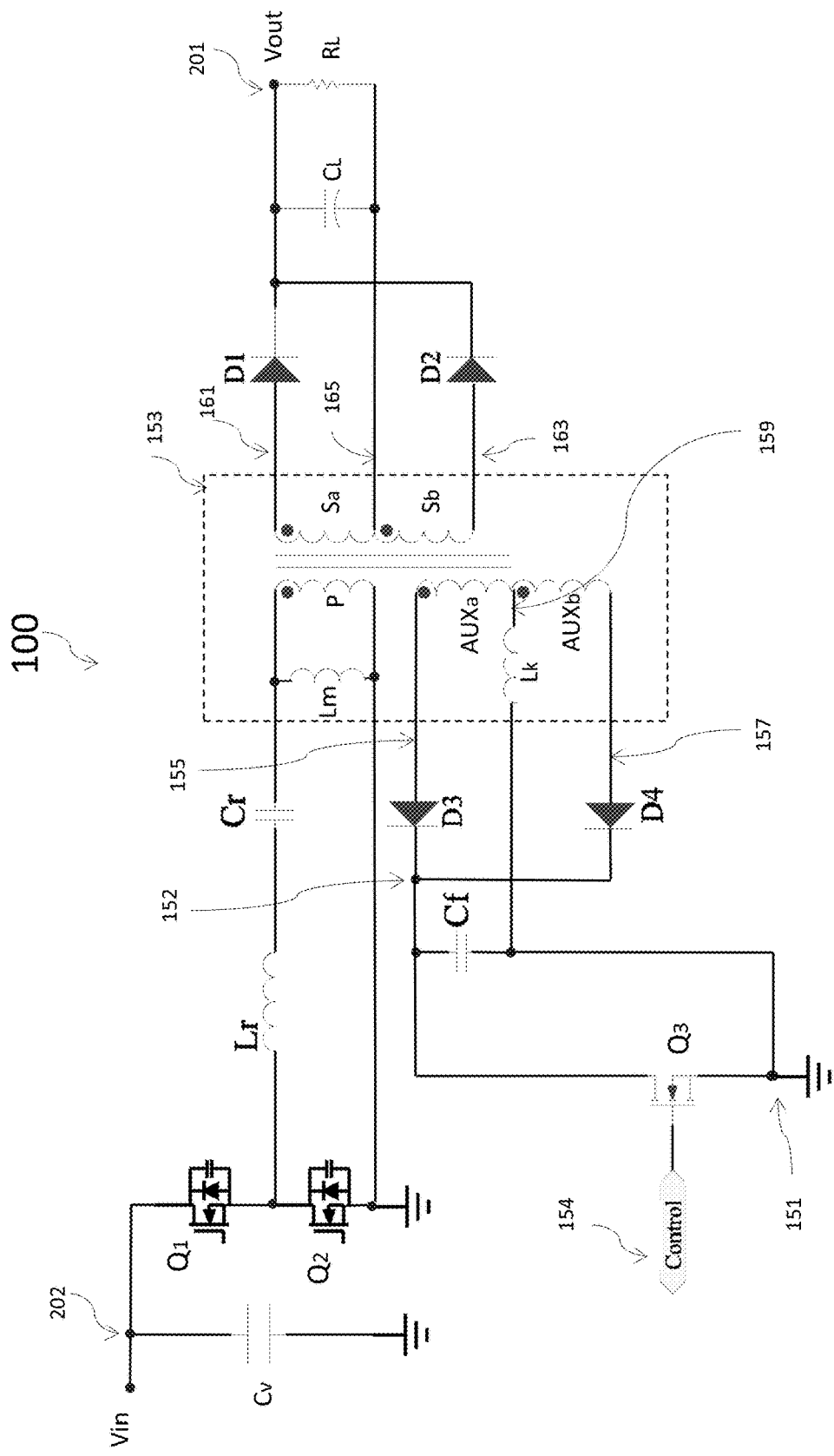
FIGS. 1A and 1B each illustrates a schematic view of an embodiment LLC power converter.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a power conversion system that includes an LLC power converter. Embodiments of the present invention may also be applied to other types of electronic power conversion devices and other power conversion architectures.

In various embodiments, an LLC power converter includes a controller that is configured to couple the leakage inductance of the auxiliary winding to the primary or secondary side of the circuit when input voltage drops below a pre-determined threshold. Improved gain control capability is obtained, resulting in improved performance (e.g., better ability to maintain output voltage at desired value). In some embodiments, by coupling the leakage inductance of the auxiliary winding to the primary winding, more electromagnetic energy can be stored in the system, which results in a longer holdup time (e.g., the amount of time the power converter can operate after the power is removed from the input of the power supply). In some embodiments, besides the auxiliary winding, the auxiliary side of the circuit includes two diodes and a switch without the need for any extra choke, resulting in a low-cost design.

In various embodiments, the transformer of the LLC power converter includes a core having a series of magnetic portions and a series of air gaps that may be dimensioned to provide the requisite inductances (e.g., leakage inductance, magnetizing inductance and resonant inductance) that are may be used in the LLC power converter. The disclosed transformer designs enable compact transformer designs, and reduce eddy current effectively, thus achieving high efficiency at a low cost (e.g., no resonant choke needed).

A switched-mode power converter (also referred to as a "power converter" or "regulator") is a power supply or power processing circuit that converts an input voltage waveform into a specified output voltage waveform. DC-DC power converters convert a DC input voltage which may be time varying into a DC output voltage. Controllers associated with the power converters manage an operation thereof by controlling conduction periods or switching frequencies of switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a switching frequency of the power switches of a resonant power converter. As voltage or current for systems, such as a microprocessor powered by the power converter, dynamically change (e.g., as a computational load on a load microprocessor changes), the controller is configured to dynamically increase or decrease the switching frequency of the power switches therein to maintain an output characteristic, such as an output voltage, at a desired value. A controller for a power converter is generally formed as an integrated circuit with conductive pins that are soldered or otherwise electrically bonded to a printed wiring board in an end product.

To provide the voltage conversion and regulation functions, the power converters include active power switches such as metal-oxide semiconductor field-effect transistors (MOSFETs) that are coupled to the input voltage source and periodically switch a reactive circuit element such as an inductor to the voltage source at a switching frequency that may be on the order of 100 kHz or higher. To provide a DC output voltage, the power converters include diodes to provide a rectification function. When high power conversion efficiency is desired, synchronous rectifiers may be substituted for the rectifying diodes.

Turning initially to FIG. 1A, illustrated is a schematic drawing of an embodiment of resonant half-bridge LLC power converter 100. Input port 202 is coupled to an input voltage Vin, which may be a DC voltage supply. Capacitor $C_v$, which may be optional, is coupled between input port 202 and a reference voltage level (e.g., electrical ground). Capacitor $C_v$ may help to filter out high-frequency noise at input port 202. As illustrated in FIG. 1A, in the primary side of the circuit, the half-bridge LLC converter has two series-coupled power switches, e.g., MOSFETs $Q_1$ and $Q_2$. Power switches $Q_1$ and $Q_2$ are sometimes referred to as the switching bridge of the LLC converter. While in the illustrated embodiment the power train employs a half-bridge resonant power converter topology, those skilled in the art should understand that other converter topologies such as a full-bridge power converter topology are well within the broad scope of the present invention.

As illustrated in FIG. 1A, the switching bridge is coupled to resonant inductor $L_r$, resonant capacitor $C_r$, and transformer 153. Transformer 153 includes primary winding P, second winding S (e.g., winding portions $S_a$ and $S_b$) and an auxiliary winding AUX (e.g., winding portions $AUX_a$ and $AUX_b$), in some embodiments. In the example of FIG. 1A, the primary side of transformer 153 is shown as primary winding P coupled in parallel with a magnetizing inductor $L_m$. In some embodiments, magnetizing inductor $L_m$ illustrated in FIG. 1A represents the magnetizing inductance $L_m$ of primary winding P of transformer 153, thus is not a stand-alone inductor separate from primary winding P. Skilled artisans will readily appreciate that for analysis and modeling of the LLC converter, it is customary to show the primary winding of transformer 153 as a magnetizing inductor $L_m$ coupled in parallel to a primary winding P, as illustrated in FIG. 1A. Resonant inductor $L_r$, resonant capacitor $C_r$, and magnetizing inductor $L_m$ form an LLC tank, in various embodiments. An LLC tank may be referred to as an LLC tank circuit, or an LLC resonant tank in the discussion hereinafter.

Referring to FIG. 1A, secondary winding S of transformer 153 includes a first winding portion $S_a$ and a second winding portion $S_b$. A first terminal 161 of the secondary winding, sometimes referred to as a tap 161, is coupled to a first end of secondary winding S. A second terminal 163 is coupled to a second end of secondary winding S. A third terminal 165 is between the first terminal 161 and second terminal 163 of secondary winding S. For example, third terminal 165 may be a center tap of the secondary winding. Diodes $D_1$ and $D_2$ are secondary side rectifier diodes. In alternative embodiments, synchronous rectifier power switches may be employed in place of diodes $D_1$ and $D_2$. Diodes $D_1$ and $D_2$ form a full-wave rectifier that converts the output of transformer 153 into a DC voltage. The DC voltage is filtered by output capacitor $C_L$ and sent to output port 201 coupled to a load $R_L$, in some embodiments. In other embodiments, a full-bridge rectifier may be used which includes four diodes. Full-bridge rectifiers and full-wave rectifiers have different advantages and disadvantages, and choice of each type of rectifier are determined by design requirements and factors such as total diode conduction loss, secondary winding copper loss, component count and cost.

Still referring to FIG. 1A, transformer 153 also includes an auxiliary winding AUX with a leakage inductance $L_k$. Auxiliary winding AUX includes a first winding portion $AUX_a$ and a second winding portion $AUX_b$. Although leakage inductance $L_k$ is illustrated in FIG. 1A as an inductors $L_k$ coupled to a terminal 159 (e.g., a center tap) of auxiliary winding AUX, leakage inductance $L_k$ is not a stand-alone inductor separate from auxiliary winding AUX (e.g., portions $AUX_a$ and $AUX_b$), in some embodiments. Such illustrations are customary for modeling leakage inductances, as skilled artisans readily appreciate.

Referring to FIG. 1A, a first terminal 155 of the auxiliary winding AUX, sometimes referred to as a tap 155, is coupled to a first end of auxiliary winding AUX. A second terminal 157 of the auxiliary winding is coupled to a second end of the auxiliary winding AUX. A third terminal 159 is between the first terminal 155 and second terminal 157 of the auxiliary winding. For example, third terminal 159 may be a center tap of the auxiliary winding. A diode $D_3$ is coupled between terminal 155 and a node 152, and a diode $D_4$ is coupled between terminal 157 and node 152. As illustrated in FIG. 1A, node 152 is coupled to a reference voltage terminal 151 via a switch $Q_3$. Reference voltage terminal 151 may be coupled to electrical ground, in some embodiments. Switch $Q_3$ is an active power switch such as a MOSFET $Q_3$, in various embodiments. Other suitable switches, such as pass gates, may also be used for switch $Q_3$. In the discussion below, switch $Q_3$ may be referred to as MOSFET $Q_3$, with the understanding that other types of switches may also be used for switch $Q_3$. In the example of FIG. 1A, switch $Q_3$ is a MOSFET, the gate of MOSFET $Q_3$ is coupled to a control signal 154. A first one of the source/drain terminals of MOSFET $Q_3$, also referred to as load path terminals, is coupled to node 152, and a second one of the load path terminals of MOSFET $Q_3$ is coupled to reference voltage terminal 151, in some embodiments. Terminal 159 of the auxiliary winding is coupled to reference voltage terminal 151, in various embodiments. In addition, an optional capacitor $C_f$ may be coupled between node 152 and reference voltage terminal 151. Embodiment half bridge LLC resonant power converter 100 may be configured to achieve zero voltage switching for primary side switches, and zero current switching for secondary side rectifiers under a wide input voltage range under different load conditions.

Figure 1B:
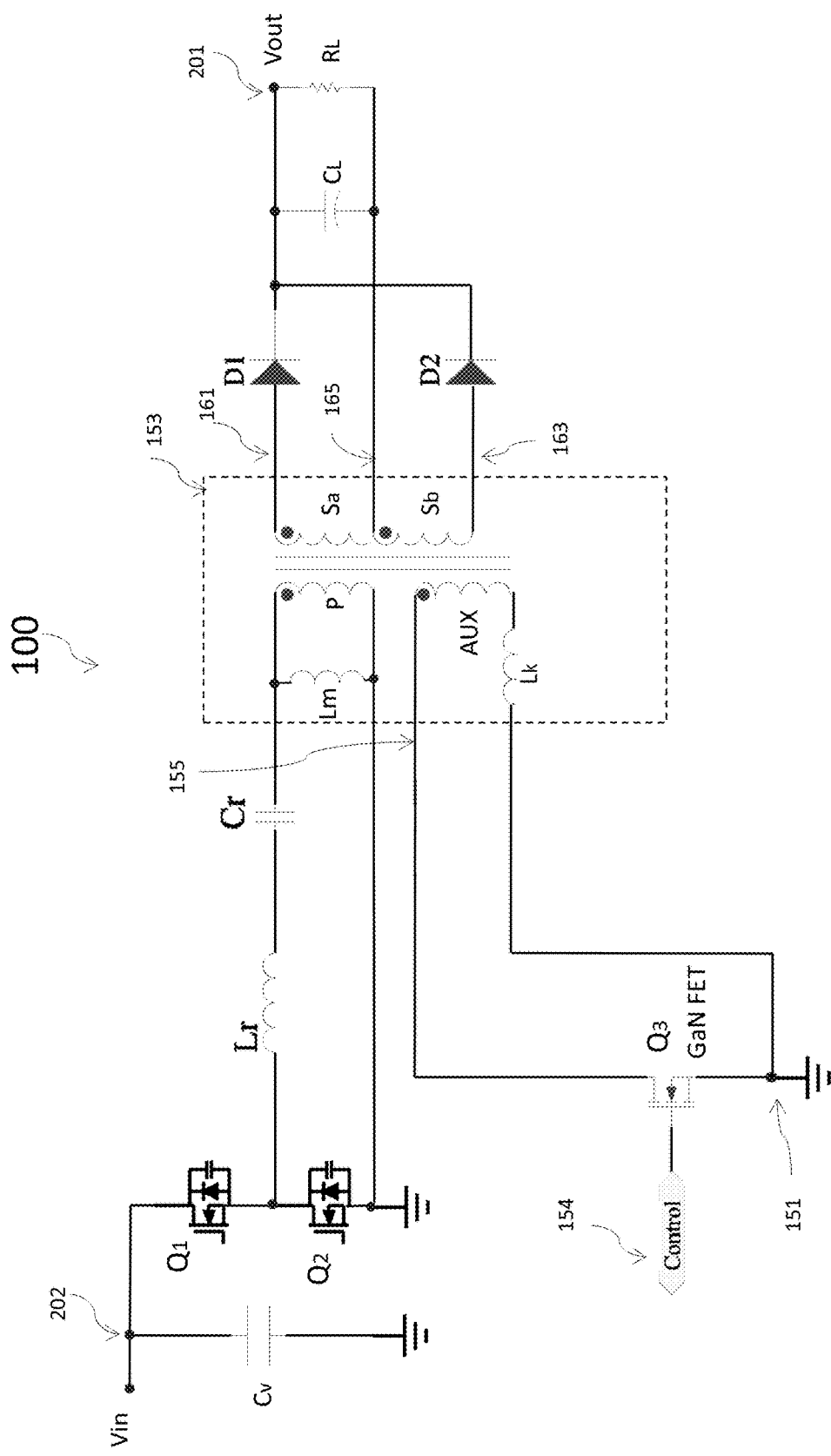

FIG. 1B illustrates a schematic drawing of another embodiment of resonant half-bridge LLC power converter 100, where similar reference numbers denote similar parts as in FIG. 1A. In the example of FIG. 1B, switch $Q_3$ is a gallium nitride (GaN) FET. In some embodiments, since GaN FET does not have a body diode, current flow in both directions (e.g., directions from one load path terminal of GaN FET to another load path terminal of GaN FET) is blocked by turning off the GaN FET $Q_3$. As a result, diode $D_3$ and $D_4$, and capacitor $C_f$ in FIG. 1A can be removed, resulting in a simpler structure as shown in FIG. 1B. Note that the discussion hereinafter uses the LLC power converter shown in FIG. 1A as examples, with the understanding that other types of LLC power converters, such as the one shown in FIG. 1B, can also be used when appropriate.

Figure 2A:
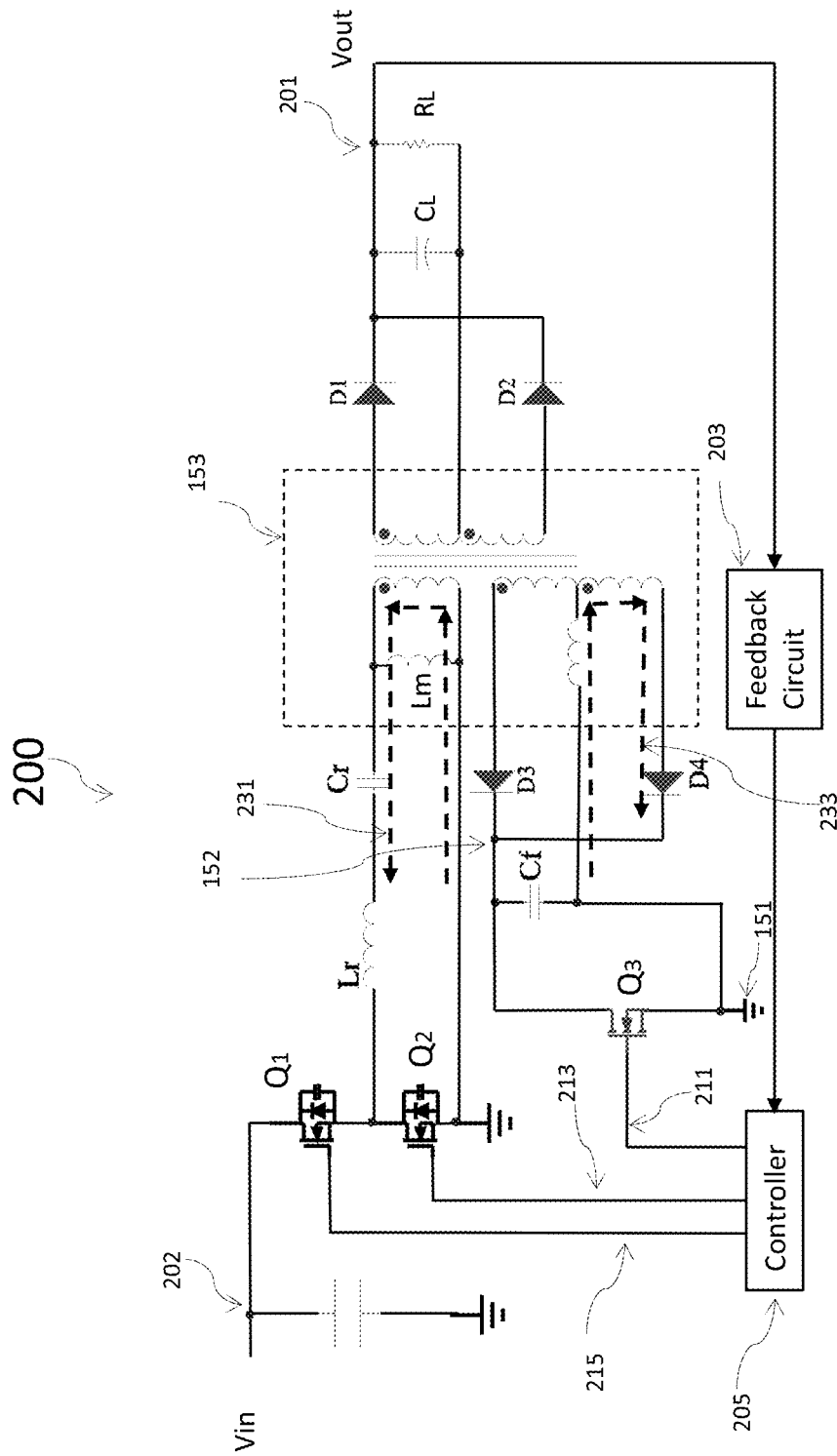
FIGS. 2A and 2B illustrate exemplary diagrams for a power system having an LLC converter.
Figure 2B:
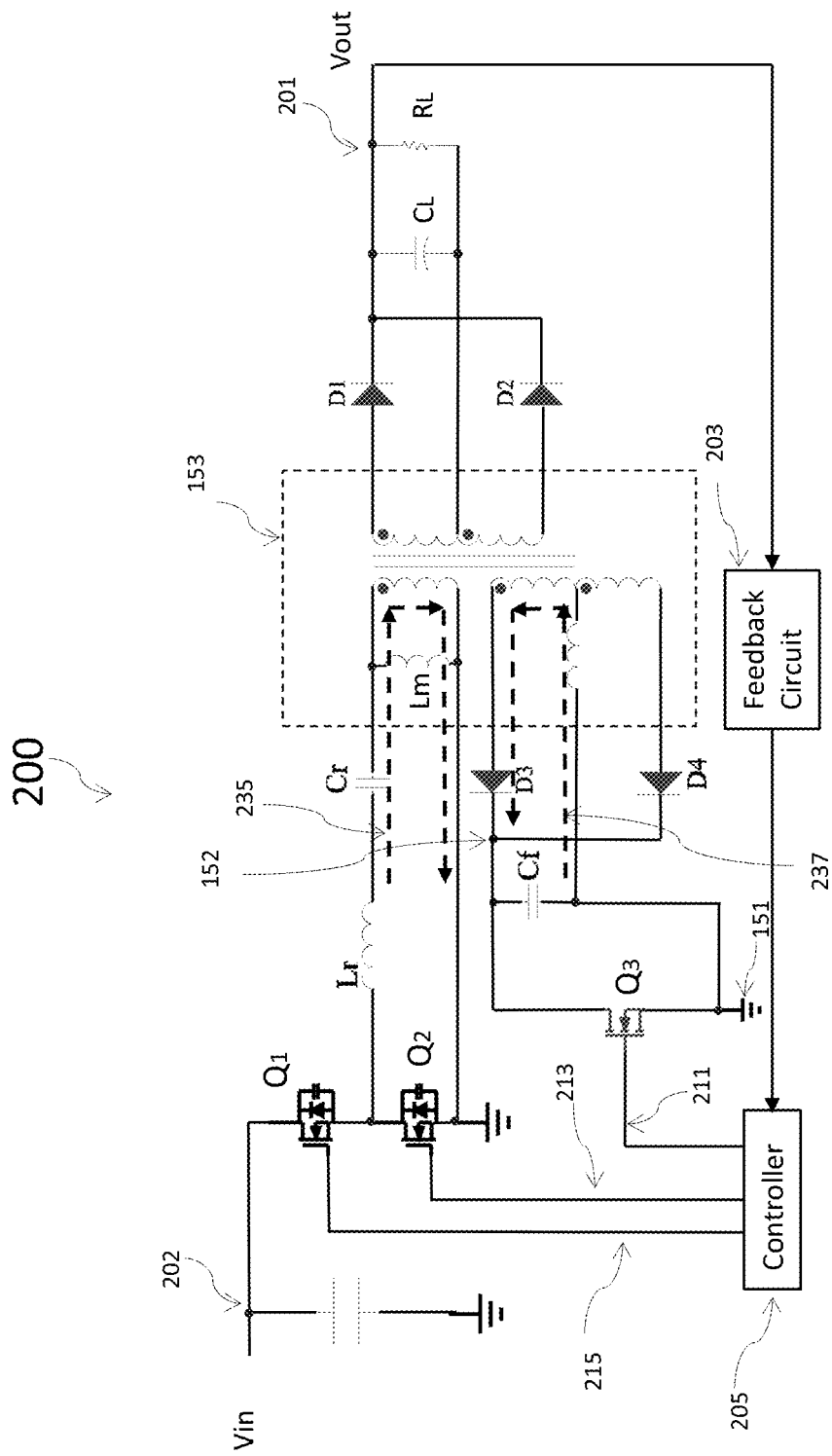

Operation of LLC converter 100 is discussed hereinafter with reference to FIGS. 2A, 2B, and 3. FIG. 2A illustrates a power conversion system 200 using LLC converter 100 shown in FIG. 1A. As illustrated in FIG. 2A, power conversion system 200 also includes a controller 205 and a feedback circuit 203. Controller 205 may be or include an integrated circuit (IC), e.g., a micro-processor unit, and may also include peripheral circuits such as comparator circuits, analog-to-digital converters (ADCs) and/or digital-to-analog converters (DACs). The comparator circuits, ADCs and/or DACs may be integrated with the micro-processor unit into one IC for higher level of integration. In other embodiments, the micro-processor unit is not integrated with peripheral circuits such as comparators, ADCs and DACs. Besides ICs, any other suitable controllers may also be used as controller 205. The power system 200 further includes feedback circuit 203 that is employed to transmit a sensed output characteristic across the isolation boundary provided by power transformer 153 to controller 205. Feedback circuit 203 may be configured to provide a measurement or an estimate of the output voltage $V_{out}$ at output port 201 of the LLC converter. The measurement or estimate may be an analog signal or digital signal. Various circuit devices such as an opto-isolator to provide this isolation function are well known in the art and maybe be used as the feedback circuit, thus will not be described further herein.

During operation, controller 205 switches power switches $Q_1$ and $Q_2$ on and off alternately to generate a time-varying waveform (e.g., a square waveform) to excite the LLC resonant tank, in some embodiments. The LLC tank circuit generates a resonant current (e.g., a resonant sinusoidal current) in the primary side of the LLC converter, which resonant current is scaled by transformer 153 and rectified by the rectifier circuit (e.g., diodes $D_1$ and $D_2$). The gain K of the resonant tank circuit is given by Equation (1) below:

$$K(Q, m, F_x) = \frac{F_x^2(m-1)}{\sqrt{(mF_x^2-1)^2 + F_x^2(F_x^2-1)^2(m-1)^2 Q^2}} \quad (1)$$

where $$Q = \frac{\sqrt{L_r/C_r}}{R_{ac}}$$

is the quality factor (Q-factor), $$R_{ac} = \frac{8n^2 R_L}{\pi^2}$$

is the reflected load resistance, with $R_L$ being the load resistance and n being the turns ratio of primary over secondary, $$f_r = \frac{1}{2\pi\sqrt{L_r C_r}}$$

is the resonant frequency, $$F_x = \frac{f_s}{f_r}$$

is the normalized switching frequency, with $f_s$ being the switching frequency, and $$m = \frac{L_r + L_m}{L_r}$$

is the ratio of total primary inductance to resonant inductance.

Based on Equation (1), gain curves showing gain K versus normalized switching frequency $F_x$ can be plotted for a given quality factor Q and ratio of total primary inductance to resonant inductance m. Such gain curves typically show a peak gain at $F_x=1$ (e.g., when switching frequency $f_s$ is equal to resonant frequency $f_r$), with gain K increasing monotonically with decreasing switching frequency $f_s$ for $f_s > f_r$.

Still referring to FIG. 2A, power system 200 includes an LLC resonant converter coupled to an input voltage source $V_{in}$, and controller 205 that regulates a power converter output characteristic such as an output voltage $V_{out}$ by regulating a switching frequency $f_s$ of the LLC power converter. The output voltage $V_{out}$ at output port 201 of the LLC power converter may fluctuate due to, e.g., a load change or a drop in input voltage $V_{in}$. Controller 205 together with feedback circuit 203 senses the output voltage $V_{out}$ of the power converter, and based on a desired output voltage $V_{ref}$, controls switching frequency $f_s$ of the primary-side power switches (e.g., switches $Q_1$ and $Q_2$) to regulate the output voltage $V_{out}$ at the desired output voltage $V_{ref}$. Equation (1) above shows that gain K of an LLC converter could be adjusted by changing switch frequency $f_s$ of the LLC power converter. For example, when output voltage $V_{out}$ is above desired output voltage $V_{ref}$, controller 205 may decrease gain K by increasing switching frequency $f_s$ of the LLC power converter. Conversely, when output voltage $V_{out}$ is below desired output voltage $V_{ref}$, controller 205 may increase gain K by reducing switching frequency $f_s$ of the LLC power converter.

When input voltage $V_{in}$ fluctuates within a pre-determined input voltage range, e.g., between a pre-determined low voltage value (also referred to as a nominal low input voltage) and a pre-determined high voltage value (also referred to as a nominal high input voltage), controller 205 may be able to maintain a substantially constant output voltage $V_{out}$ by adjusting the gain of the LLC converter (e.g., gain K defined in Equation (1)) by adjusting switching frequency $f_s$. To achieve zero voltage switching (ZVS), LLC power converters are normally designed to work in the inductive region. In the inductive region, there is a one-to-one correspondence between switching frequency $f_s$ and gain K, in some embodiments. Therefore, the pre-determined input voltage range corresponds to a pre-determined range of switching frequency fs. Switch $Q_3$ remains open (e.g., not connecting node 152 to reference voltage terminal 151) when input voltage $V_{in}$ is within the pre-determined input voltage range.

When input voltage $V_{in}$ drops by a large amount (e.g., more than 10 percent below the nominal low input voltage), decreasing switching frequency $f_s$ may be insufficient to maintain output voltage $V_{out}$ in some situations. For example, if switching frequency $f_s$ is already at resonant frequency $f_r$, and gain K is at a maximum value, shifting $f_s$ might not increase output voltage $V_{out}$. As another example, there may be design restrictions regarding how low the switching frequency $f_s$ could be, thus limiting the range within which $f_s$ could be adjusted. If the drop of input voltage $V_{in}$ is beyond the gain adjusting capability of the LLC power converter, output voltage $V_{out}$ eventually drops below a desired value (e.g., a nominal output voltage).

Referring to FIG. 2A, when controller 205 detects that input voltage $V_{in}$ drops below a pre-determined threshold $V_{in\_s}$, MOSFET $Q_3$ is turned on (e.g., connecting node 152 with reference voltage terminal 151), in accordance with an embodiment of the present disclosure. The pre-determined threshold of input voltage $V_{in\_s}$ may be defined as a voltage that is lower than the nominal low input voltage by a certain percentage, e.g., 10 percent. When input voltage $V_{in}$ is above the pre-determined threshold $V_{in\_s}$, controller 205 turns off switch $Q_3$, in various embodiments. In some embodiments, controller 205 may turn off switch Q3 with hysteresis. For example, controller 205 turns off switch $Q_3$ when input voltage $V_{in}$ rises above the pre-determined threshold $V_{in\_s}$ by a pre-determined margin, instead of turning off switch $Q_3$ upon detecting that $V_{in}$ rises above the pre-determined threshold $V_{in\_s}$.

In other embodiments, when controller 205 detects that switching frequency $f_s$ drops below a pre-determined threshold $f_{s\_s}$, MOSFET $Q_3$ is turned on (e.g., connecting node 152 with reference voltage terminal 151). The pre-determined threshold $f_{s\_s}$ may be defined as 10 percent less than a nominal low switching frequency, as an example. As another example, the pre-determined threshold $f_{s\_s}$ may be 10 percent less than the resonance frequency. In some embodiments, since controller 205 adjusts switching frequency $f_s$ in response to input voltage $V_{in}$, switching frequency $f_s$ provides information regarding the corresponding input voltage $V_{in}$. When switching frequency $f_s$ is above the pre-determined threshold $f_{s\_s}$, controller 205 turns off switch $Q_3$, in various embodiments. In some embodiments, controller 205 may turn off switch Q3 with hysteresis. For example, controller 205 turns off switch $Q_3$ when switching frequency $f_s$ rises above the pre-determined threshold $f_{s\_s}$ by a pre-determined margin, instead of turning off switch $Q_3$ upon detecting that $f_s$ rises above the pre-determined threshold $f_{s\_s}$. By controlling the switching of switch $Q_3$ via switching frequency $f_s$ instead of input voltage $V_{in}$, voltage detection circuit (e.g., a high-voltage detection circuit) may be advantageously obviated.

Still referring to FIG. 2A, due to the electromagnetic coupling between primary winding P and auxiliary winding AUX (e.g., $AUX_a$ and $AUX_b$), voltages are generated across auxiliary winding portions $AUX_a$ and $AUX_b$ by the resonant current in the primary winding, in various embodiments. The polarity of the voltages across auxiliary winding portions $AUX_a$ and $AUX_b$ may change with the change of direction of the resonant current in primary winding P. However, as illustrated in FIGS. 2A and 2B, diode $D_3$ and $D_4$ are configured such that regardless of the polarity of the voltages across auxiliary winding portions AUXa and $AUX_b$, electrical current can flow through one of the diodes $D_3$ and $D_4$ toward reference terminal 151 (e.g., an electrical ground terminal) when MOSFET $Q_3$ is turned on. In the example of FIG. 2A, dotted line 231 illustrates the direction of current flow in the primary winding at a certain time, and dotted line 233 illustrates the direction of current flow in the auxiliary winding at that time. FIG. 2B illustrates the same power system 200 as shown in FIG. 2A, with the direction of current flow in the primary winding (e.g., dotted line 235) and the direction of current flow in the auxiliary winding (e.g., dotted line 237) illustrated for another moment, which directions are opposite the directions shown by dotted lines 231 and 233 in FIG. 2A. Therefore, diode $D_3$ and $D_4$ are configured to support bi-directional current flow in auxiliary winding AUX (e.g., current can flow in opposite directions in auxiliary winding AUX). In some embodiments, electrical current flows through the load path (e.g., the electrical path between load path terminals) of MOSFET $Q_3$ toward reference voltage terminal 151 when $Q_3$ is turned on. By allowing bi-direction current flow, saturation of the magnetic core of transformer 153 may be avoided in some embodiments.

As MOSFET $Q_3$ is turned on and current flows through auxiliary winding portions $AUX_a$ or $AUX_b$, the corresponding leakage inductance $L_k$ is coupled to the primary side via electromagnetic coupling, in various embodiments. The leakage inductance of the auxiliary winding seen at the primary side, sometime referred to as the transformed leakage inductance, may be modeled as a transformed leakage inductance coupled in parallel to magnetizing inductance $L_m$. The value of the transformed leakage inductance may depend on factors such as auxiliary winding leakage inductance $L_k$, turns ratio between primary winding and auxiliary winding, distance between primary winding and auxiliary winding, and other transformer design parameters. In some embodiments, the transformed leakage inductance is smaller than magnetizing inductance $L_m$. For example, the leakage inductance of the auxiliary winding, seen by the primary side of the transformer, is smaller than a magnetizing inductance of the primary winding.

Figure 5:
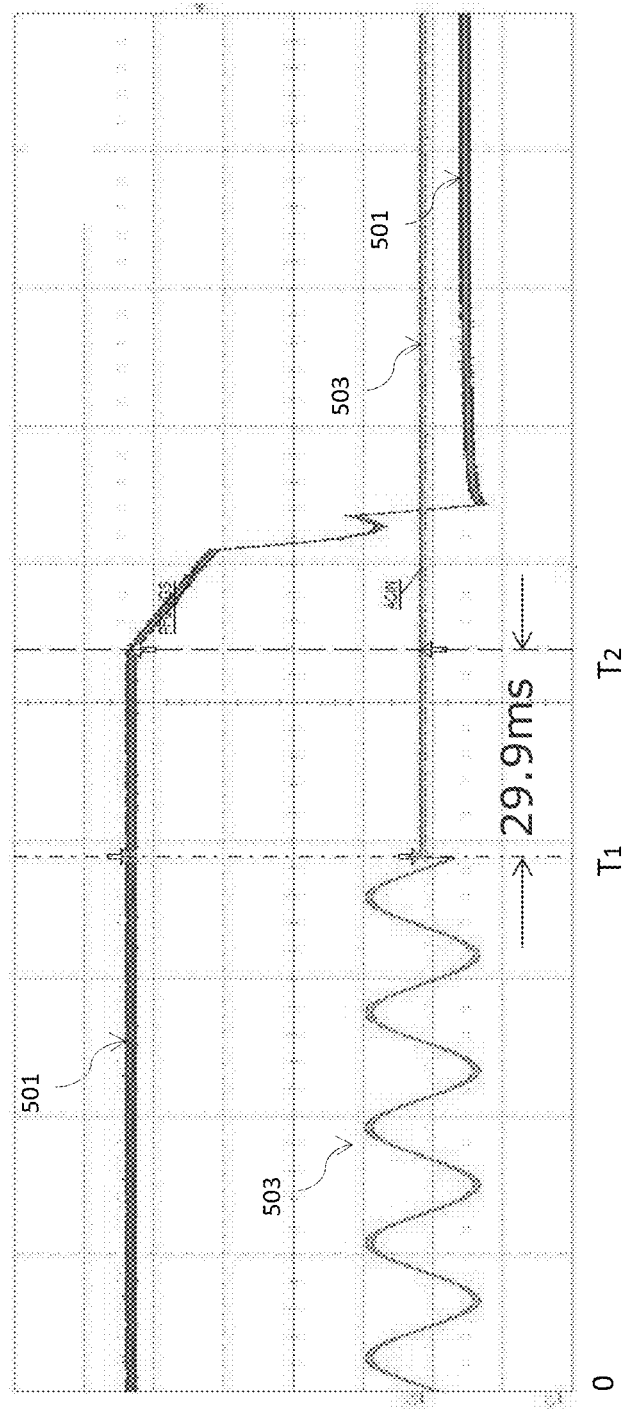
FIGS. 5 and 6 illustrate waveforms for the input voltage and output voltage of the LLC converter at different modes of operation.
Figure 6:
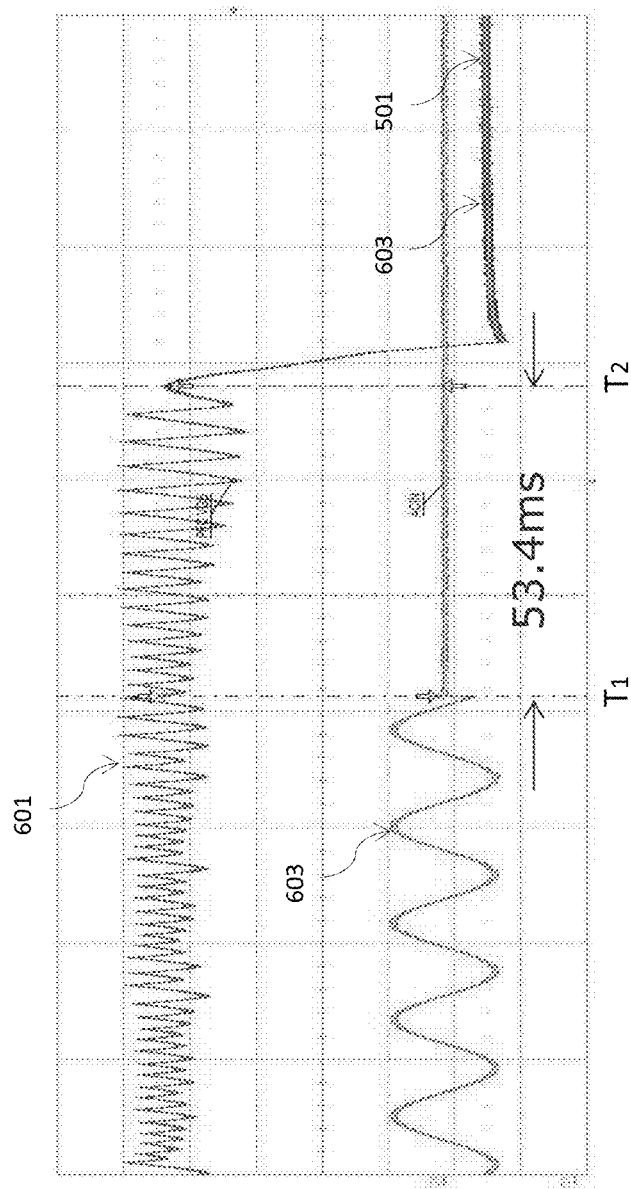

Still referring to FIG. 2A, the transformed leakage inductance coupled with magnetizing inductance $L_m$ (e.g., parallel coupling) could be modeled as an equivalent magnetizing inductance $L_m'$ that is smaller than $L_m$, in some embodiments. It can be shown from Equation (1) that when the magnetizing inductance of an LLC power converter decreases (e.g., resulting in a smaller ratio of total primary inductance to resonant inductance m), gain K defined in Equation (1) increases, in some embodiments. Therefore, by coupling the leakage inductance $L_k$ with magnetizing inductance $L_m$, power system 200 may have improved adjusting capability (e.g., improved gain level) to maintain a substantially constant output voltage $V_{out}$ for a longer period of time in the event of a large drop of input voltage $V_{in}$. In various embodiments, the lower equivalent magnetizing inductance $L_m'$ may allow more electromagnetic energy to be stored in the system, thereby increasing the holdup time of the power converter in the event that the power is removed from the input of the power converter, as illustrated by FIGS. 5 and 6, and the discussion thereof hereinafter. This illustrates another advantage of the present disclosure.

Figure 3:
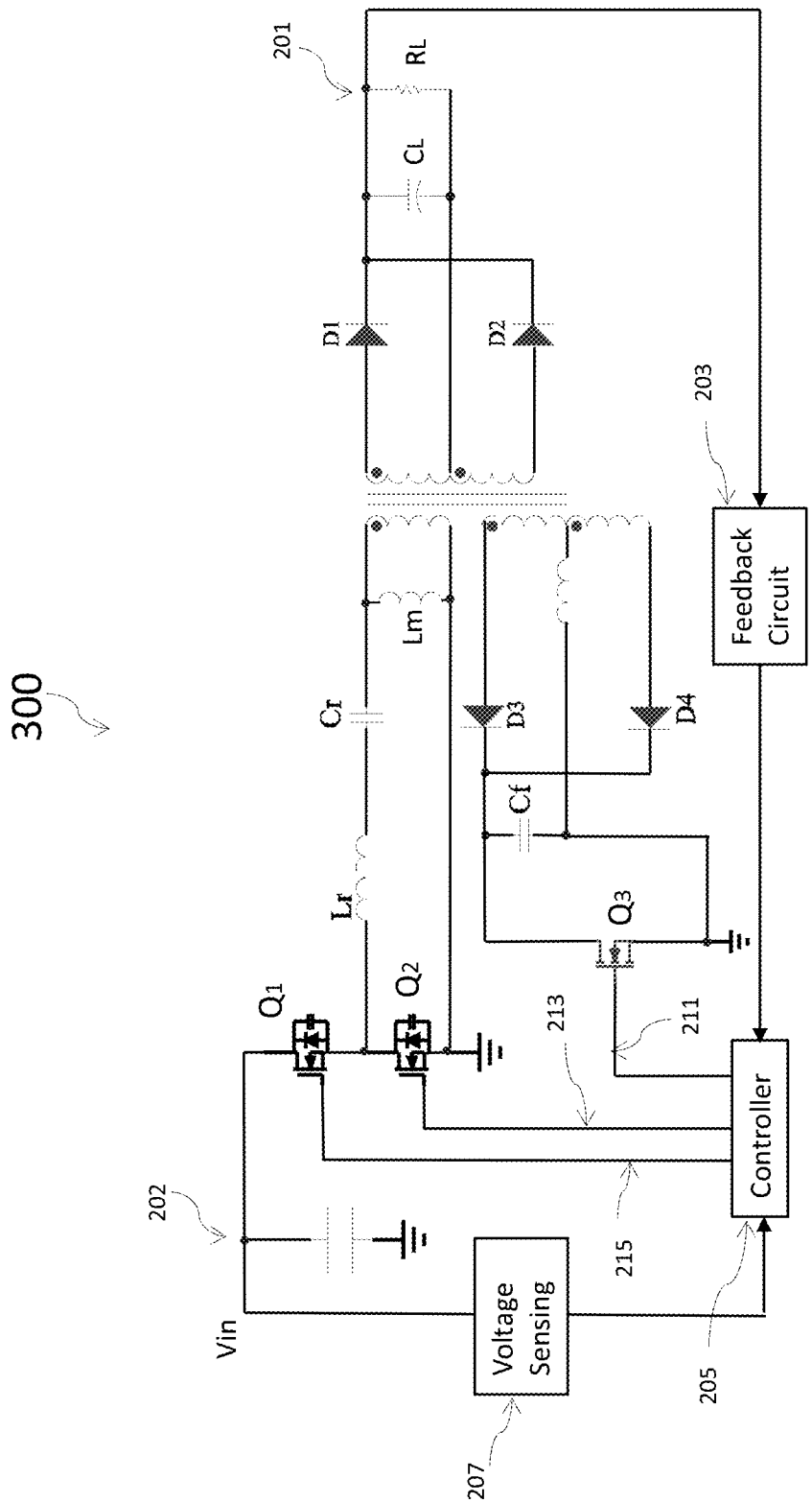
FIG. 3 illustrates another diagram for a power system having an LLC converter.

Referring now to FIG. 3, a power conversion system 300 that includes an LLC power converter, a controller 205, a feedback circuit 203, and a voltage sensing circuit 207 is illustrated. Power system 300 may have a similar structure as power system 200 in FIG. 2A, with the addition of voltage sensing circuit 207. Power system 200 in FIG. 2A detects a drop of input voltage $V_{in}$ below a pre-determined threshold $V_{in\_s}$ by monitoring switching frequency $f_s$, whereas power system 300 in FIG. 3 detects the drop of input voltage $V_{in}$ below a pre-determined threshold $V_{in\_s}$ by directly monitoring input voltage $V_{in}$ via voltage sensing circuit 207, in various embodiments. Voltage sensing circuit 207 provides a measurement or an estimate of input voltage $V_{in}$ to controller 205, in various embodiments.

Figure 4:
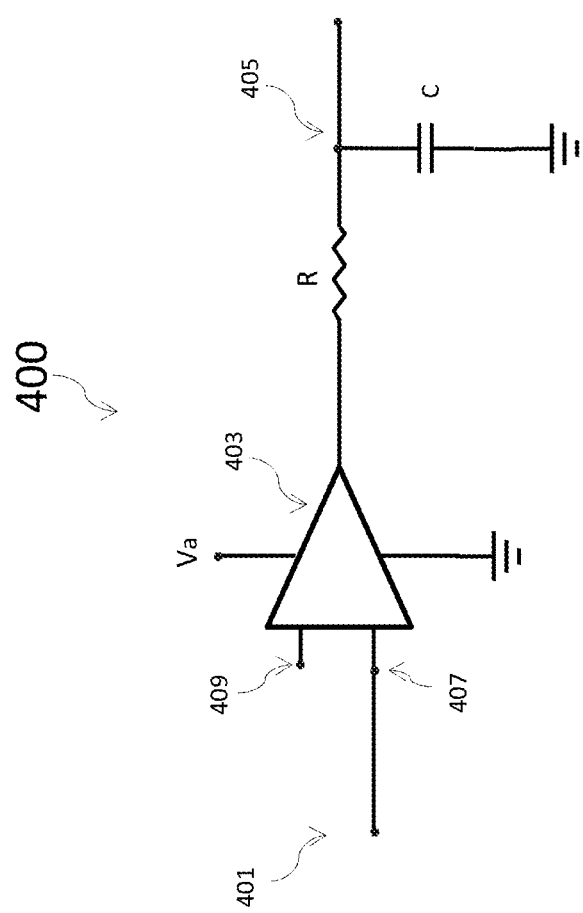
FIG. 4 illustrates a gate driver for an LLC converter.

To turn on MOSFET $Q_3$, controller 205 may provide an appropriate control voltage, e.g., a logic high voltage of 3.3V, to the gate of MOSFET $Q_3$. As discussed above, turning on MOSFET $Q_3$ couples leakage inductance of the auxiliary winding to the primary winding, thereby increasing the gain of the LLC converter. To prevent a sudden gain change, it may be desirable to turn on MOSFET $Q_3$ gradually over a pre-determined period of time, e.g., between about one millisecond (ms) to about 10 ms, although a shorter time such as a few micro seconds (μs) may be used for loops with a shorter response time. FIG. 4 illustrates a gate driver circuit 400, which includes an operational amplifier 403, a resistor R and a capacitor C. Note that not all components of gate driver circuit 400 are shown in FIG. 4. Operation amplifier 403 may be used as part of a level shifter to shift a first voltage level applied at input terminal 407 to a second voltage level at output port 405 that is more suitable for turning on switch $Q_3$. In addition, resistor R and capacitor C form an RC (resistor-capacitor) circuit with an RC constant. The RC constant may be adjusted according to the desired period of time for turning on switch $Q_3$. For example, the RC constant of gate driver circuit 400 may be tuned to be about 1 ms to about 10 ms. Gate driver circuit may be coupled between controller 205 and switch $Q_3$, with input terminal 401 coupled to controller 205 and output port 405 coupled to the gate of switch $Q_3$. In other embodiments, controller 205 provides a control voltage directly to the gate of switch $Q_3$ without using gate driver circuit 400. The optional capacitor $C_f$ in FIGS. 1-3, which is coupled between node 152 and reference voltage terminal 151 if used, helps to turn on switch $Q_3$ gradually for a smooth gain change, in some embodiments. When input voltage $V_{in}$ is above the pre-determined threshold (e.g., $V_{in\_s}$), controller 205 turns off switch $Q_3$, in various embodiments.

Power systems 200 and 300, as illustrated in FIGS. 2 and 3, may be partitioned in many different ways for implementation. For example, the LLC power converter may be implemented in an integrated circuit (IC), and controller 205 may be or include another IC different from the LLC power converter. As another example, the LLC power converter and controller 205 may be integrated into one IC for higher level of integration. For example, LLC power converter and controller 205 may be monolithically integrated on a semiconductor substrate to form an IC. The substrate may comprise crystalline silicon, crystalline germanium, silicon germanium, and/or a III-V compound semiconductor such as GaAsP, AlInAs, AlGaAs, GaInAs, GaInP, GaInAsP, and the like. Feedback circuit 203 may be implemented as an IC, or may be implemented using discrete components. Feedback circuit 203 may be integrated with controller 205, and/or the LLC power converter into one IC. Various partitions and implementations are possible and are within the scope of the present disclosure.

FIGS. 5 and 6 illustrate waveforms of input voltage and output voltage of a power system (e.g., power system 200 or 300) in a test for measuring holdup time. Holdup time measures the ability of the power system to maintain output voltage $V_{out}$ in the event of loss of input voltage $V_{in}$. In FIG. 5, curve 503 illustrates input voltage $V_{in}$, and curve 501 illustrates output voltage $V_{out}$. In the test shown in FIG. 5, switch $Q_3$ remains off to serve as a reference for comparison with the results shown in FIG. 6. From time 0 to time $T_1$, a sinusoidal input voltage source is applied at input port 202 (see, e.g., FIG. 2A), and a substantially constant output voltage is obtained at output port 201 due to the closed loop control of the power system. At time $T_1$, the sinusoidal voltage source is disconnected from input port 202. The power system adjusts the gain of the LLC converter to compensate for the drop of input voltage, and output voltage $V_{out}$ is maintained for a short period of time from $T_1$ to $T_2$, before output voltage starts to drop. A holdup time of 29.9 ms is measured between time $T_1$ and $T_2$. In the test of FIG. 5, the inductance of resonant inductor $L_r$ is about 100 μH, the inductance of magnetizing inductor $L_m$ is about 1000 uH, and the capacitance of resonant capacitor $C_r$ is about 47 nF.

In FIG. 6, a similar test as the one in FIG. 5 is performed, and the auxiliary winding AUX (e.g., $AUX_a$, $AUX_b$) and leakage inductance $L_k$ are shorted (e.g., by replacing switch $Q_3$ with a conductive wire) to illustrate the effect of shorting leakage inductance $L_k$ on holdup time. The holdup time measured between time $T_1$ and $T_2$ is 53.4 ms, which is longer than the holdup time of 29.9 ms when switch $Q_3$ remains off as shown in FIG. 5. In the test shown in FIG. 6, the transformed leakage inductance is coupled to magnetizing inductor $L_m$. The effective magnetizing inductance $L_m'$ in the test of FIG. 6 is about 260 μH. A longer holdup time may further reduce fluctuations of output voltage, thus improving the performance of power systems by providing a more stable output voltage. The longer holdup time afforded by the embodiment power systems is another advantage of the present disclosure.

FIGS. 7-10 illustrate various transformer designs that are well suited for use in the LLC power converter disclosed herein. In particular, the transformer designs illustrated below allows easy implementation and/or adjustment of various transformer parameters, e.g., resonant inductance $L_r$, magnetizing inductance $L_m$, and leakage inductance $L_k$.

Figure 7:
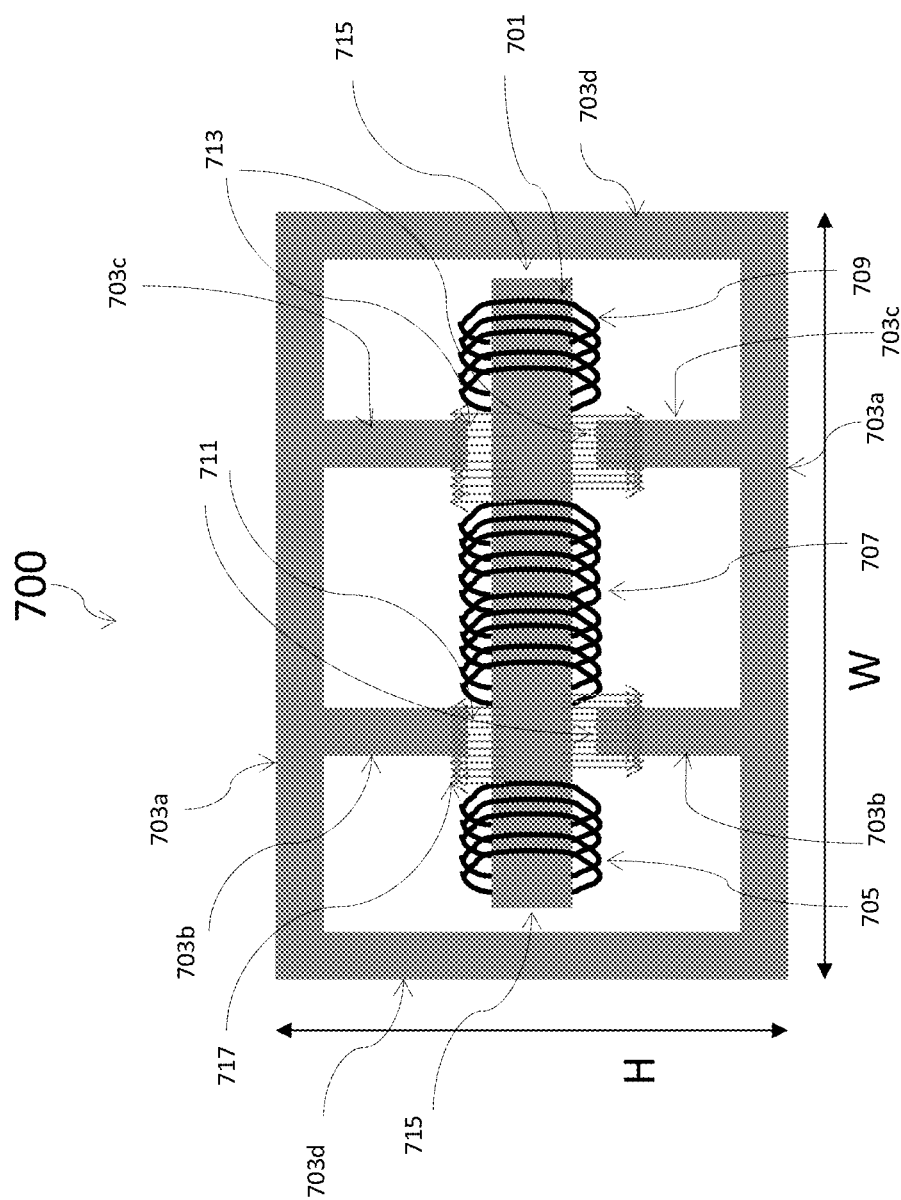
FIGS. 7-10 illustrate various transformer structures used in an LLC power converter.

FIG. 7 illustrates a transformer 700 having a center core 701 and a side core 703. Side core 703 includes a peripheral portion 703a disposed along center core 701, and a plurality of branches 703b/703c/703d (sometimes referred to as fingers 703b/703c/703d) extending toward center core 701. Center core 701 and side core 703 may be made from any suitable magnetic material such as a ferromagnetic material, which includes iron. As illustrated in FIG. 7, auxiliary winding 705 winds around a first portion (e.g., a first end portion) of center core 701, primary winding 707 winds around a second portion (e.g., a middle portion) of center core 701. Auxiliary winding 705 is spaced apart from primary winding 707, thus a third portion of center core 701, disposed between the first portion and the second portion of center core 701, is substantially free of any windings. Fingers 703b extend from peripheral portion 703a toward the third portion of center core 701, and air gaps 711 exist between fingers 703b and the third portion of center core 701. Leakage flux 717 is illustrated in FIG. 7 between center core 701 and the fingers (e.g., fingers 703b and 703c) of side core. Note that not all leakage flux is illustrated in FIGS. 7-10.

Still referring to FIG. 7, secondary winding 709 winds around a fourth portion (e.g., a second end portion) of center core 701 and is spaced apart from primary winding 707. A fifth portion of center core 701 is disposed between the fourth portion and the second portion of center core 701 (the portion with primary winding 707). Fingers 703c extend toward the fifth portion of center core 701, with air gaps 713 between fingers 703c and the fifth portion of center core 701. Also illustrated in FIG. 7, fingers 703d connect peripheral portions 703a disposed on opposing sides of center core 701, and air gaps 715 exist between fingers 703d and end portions of center core 701.

Referring to FIG. 7, due to the proximity of the fingers (e.g., 703b/703c/703d) to center core 701, leakage flux 717 tends to concentrate and flow from center core 701 into the nearest fingers. As a result, flux coupling to wire is reduced, and eddy current loss is advantageously reduced. By adjusting the air gap sizes (e.g., the distance between each finger and a corresponding portion of center core 701), inductance of different inductors illustrated in FIG. 1A, such as resonant inductor $L_r$, magnetizing inductor $L_m$, and leakage inductance $L_k$ can be set or adjusted. In particular, leakage inductance $L_k$ can be increased by increasing the size of air gaps 711, or decreased by decreasing the size of air gaps 711. The size of air gaps 711 may be varied from about 2 mm to about 4 mm for adjustment of leakage inductance $L_k$, in some embodiments. Similarly, size of air gaps 713 can be adjusted to set or change the inductance of resonant inductor $L_r$, and size of air gaps 715 can be adjusted to set or change the inductance of magnetizing inductor $L_m$. Air gaps 713 and 715 may have sizes ranging, independently, from about 2 mm to about 4 mm, in some embodiments.

The ability to easily change the inductances of different inductors of transformer 700 illustrates an advantage of the present disclosure. In addition, transformer design 700 allows for a more compact transformer design with smaller sizes. For example, in conventional transformer, an increase of leakage inductance is achieved by increasing the distance between the auxiliary winding and the primary winding, resulting in a large transformer size when large leakage inductance is desired. Transformer 700 offers the ability to adjust inductance by changing the size of the air gaps, thus a smaller transformer core can be used for a more compact transformer design. In some embodiments, a first dimension W of transformer 700 is smaller than about 30 mm, and a second dimension H of transformer 700 is smaller than about 32 mm. Similar advantages as those for transformer 700 are obtained for other embodiments shown in FIGS. 8-10.

Figure 8:
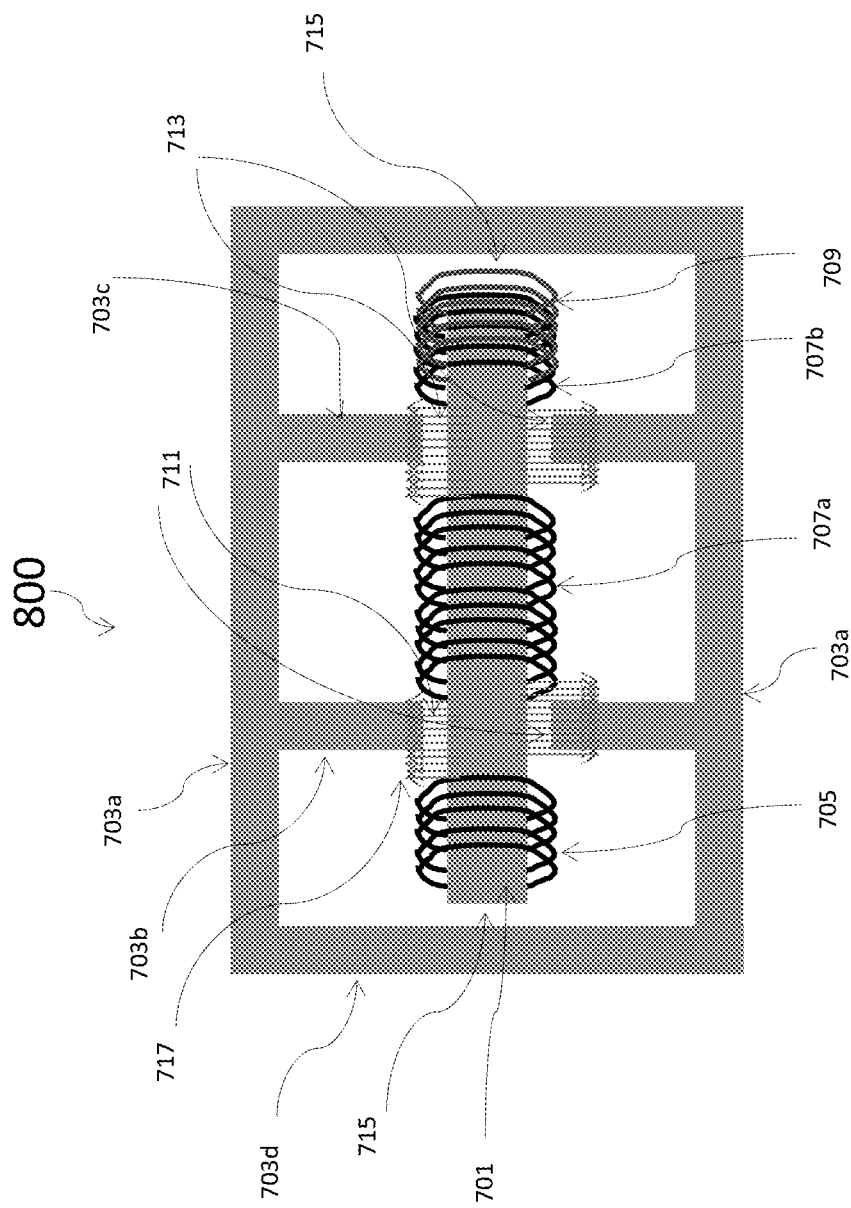

FIG. 8 illustrates another transformer 800 that may be used for an LLC converter (e.g., LLC converter 100 in FIG. 1A). Transformer 800 in FIG. 8 shares similarities with transformer 700 in FIG. 7, with similar numbers donating similar components. In FIG. 8, primary winding 707 comprises two separate winding portions (e.g., winding portions 707a and 707b) wound around two different portions of center core 701. Secondary winding 709 overlaps (e.g., winds around the same portion of center core 701) with winding portion 707b of the primary winding. Fingers 703c extend toward a portion of center core 701 that is disposed between winding portion 707a and winding portion 707b, with air gaps 713 between fingers 703c and center core 701. Similar to FIG. 7, sizes of air gaps 711, 713 and 715 could be varied to set or change the inductance of inductors $L_k$, $L_r$ and $L_m$, respectively. Compared with transformer 700 in FIG. 7, transformer 800 has the additional advantage of being able to achieve and control a small leakage inductance, due to the fact that the primary winding is partially coupled (e.g., winding portion 707a) to auxiliary winding 705.

Figure 9:
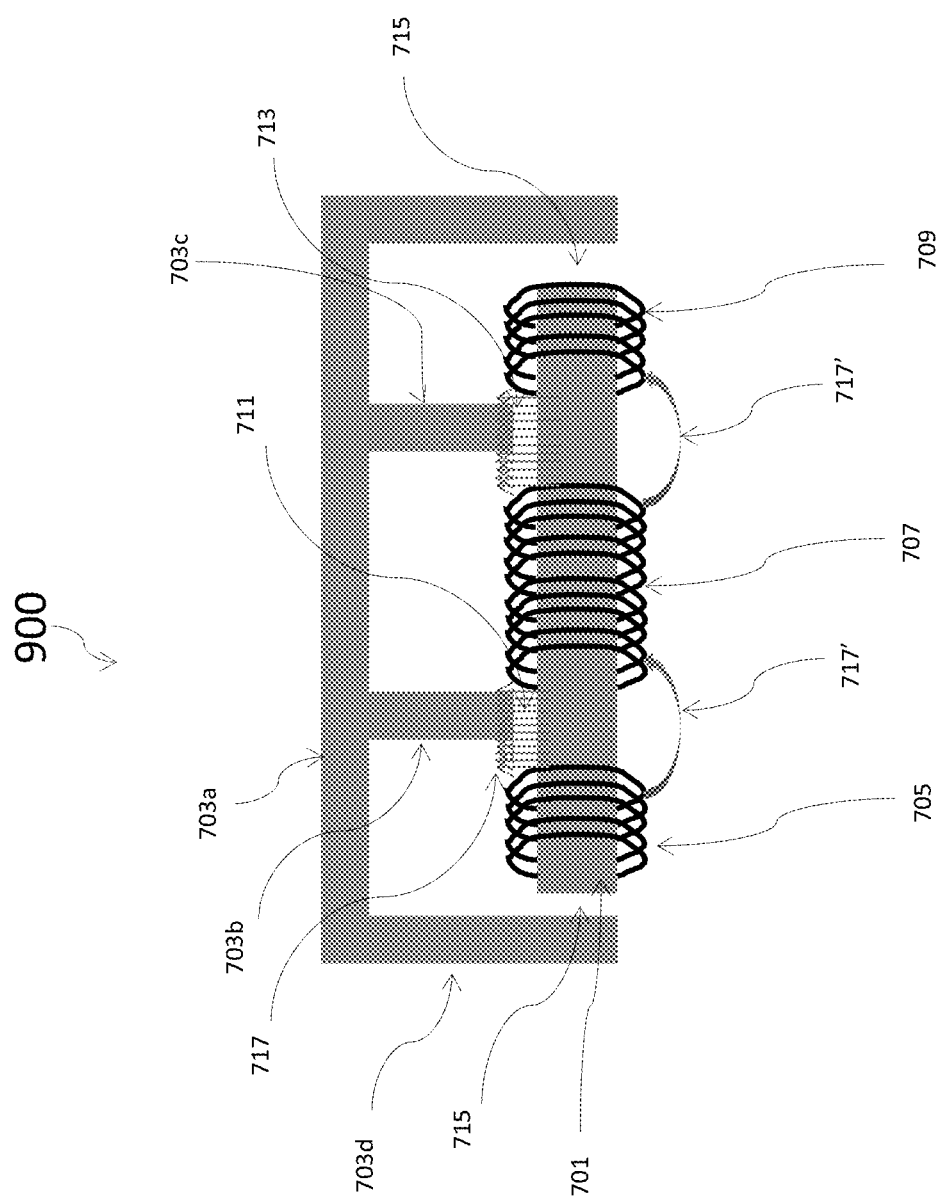

FIG. 9 illustrates another transformer 900 that may be used for an LLC converter. Compared with FIG. 7, side core 703 in FIG. 9 comprises about half of the side core 703 in FIG. 7. Similar numbers in FIGS. 7 and 9 denote similar parts. Methods for adjusting inductances (e.g., via air gap size) of the transformer is similar to those described above. Additional advantages of transformer 900 include smaller size (e.g., half the size of transformer 700), and no need to maintain balanced air gap size (e.g., equal size for both air gaps 711 in FIG. 7). However, due to the lack of fingers on the lower side (e.g., the side of center core 701 facing away from peripheral portion 703a) of center core 701, there is more leakage flux coupled to wires, as illustrated by leakage flux 717', which lowers the efficiency of transformer 900 with compared to, e.g., transformer 700.

Figure 10:
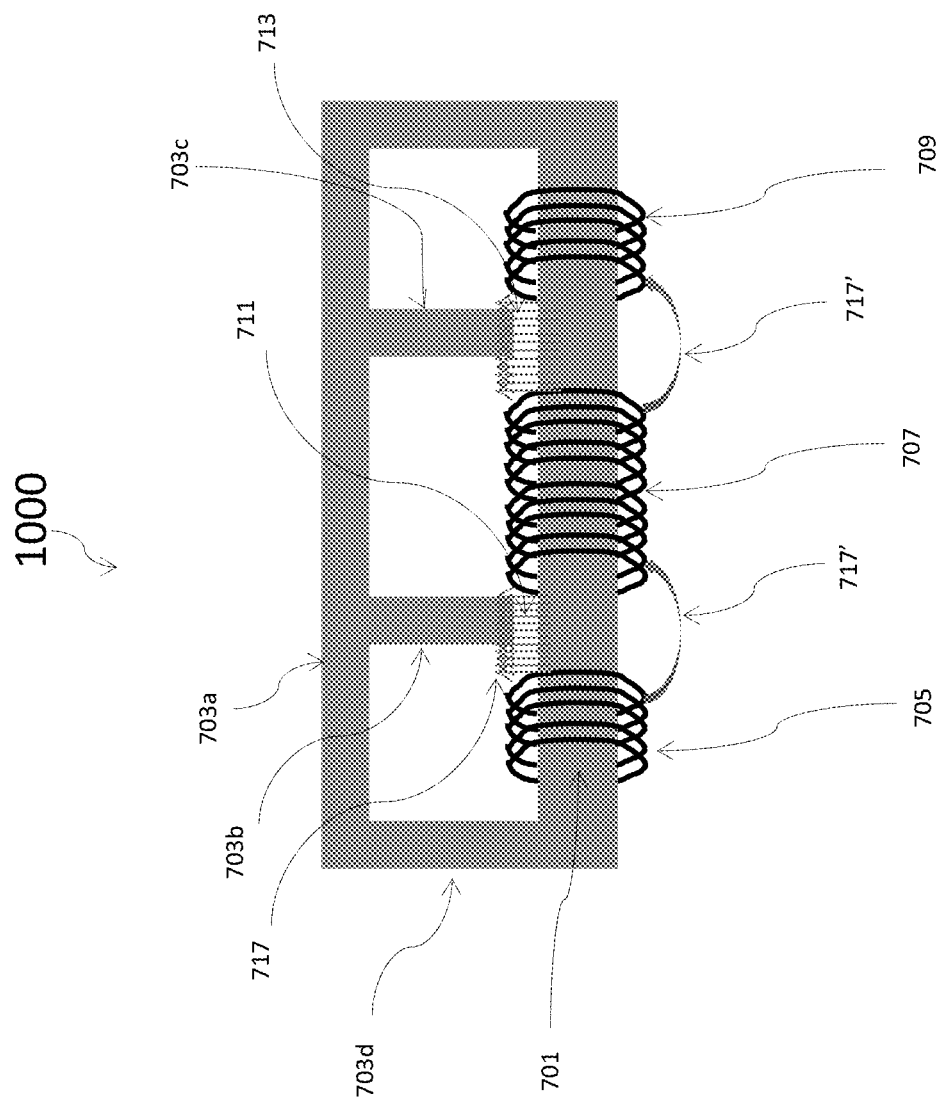

FIG. 10 illustrates yet another transformer 1000 that may be used for an LLC converter. Similar numbers in FIGS. 9 and 10 denote similar parts. In FIG. 10, fingers 703d contacts, or is fastened to, center core 701, which may advantageously simply the assembly of transformer 1000 during manufacturing. For example, center core 701 provides support for side core 703 for a stable assembly of side core 703 on center core 701. Air gaps 711 and 713 can be changed to set or adjust the inductance of inductors $L_k$ and $L_r$, as described above. Note that air gaps 715 in FIGS. 7-9 are no longer available in FIG. 10. To adjust inductance $L_m$ for transformer 1000, the relative permeability of center core 701, also referred to as the μ-value of center core 701, can be adjusted, e.g., by choosing different magnetic materials for different requirements on $L_m$ value.

FIG. 11 illustrates a flow chart of a method of operating an LLC converter, in accordance with some embodiments. It should be understood that the embodiment methods shown in FIG. 11 is an example of many possible embodiment methods. One of ordinary skill in the art would recognize many variations, alternatives, and modifications. For example, various steps as illustrated in FIG. 11 may be added, removed, replaced, rearranged and repeated.

Referring to FIG. 11, at step 2010, an input voltage to an LLC converter is detected to be below a pre-determined threshold. The LLC converter includes a transformer including a primary winding, a secondary winding and an auxiliary winding. The LL converter also includes a first diode and a second diode. A first terminal coupled to a first end of the auxiliary winding and a second terminal coupled to a second end of the auxiliary winding are coupled to a first node via the first diode and the second diode, respectively. A third terminal of the auxiliary winding between the first terminal and the second terminal is coupled to a reference terminal. The LLC converter further includes a first switch coupled between the first node and the reference terminal. At step 2020, the first switch is closed to couple the first node to the reference terminal upon detecting that the input voltage is below the pre-determined threshold.

An general aspect of the present disclosure includes an inductor-inductor-capacitor (LLC) converter including a transformer having a primary winding, a secondary winding, and an auxiliary winding. The primary winding is coupled to a primary side circuit. The auxiliary winding has a first winding portion coupled between a first terminal and a middle terminal, and a second winding portion coupled between the middle terminal and a second terminal. The LLC converter further includes a first diode coupled between the first terminal and a first node, a second diode coupled between the second terminal and the first node, and a switch coupled between the first node and a reference voltage terminal. The middle terminal of the auxiliary winding is coupled to the reference voltage terminal.

Implementation may include one or more of the following features. In some embodiments, the first diode and the second diode are configured to allow electric current to flow in opposite directions in the auxiliary winding, thereby avoiding saturation of the magnetic core of the transformer. In other embodiments, the LLC converter further includes a first capacitor coupled between the first node and the reference voltage terminal.

In various embodiments, the switch of the LLC converter includes a transistor. A first load path terminal of the transistor is coupled to the first node, and a second load path terminal of the transistor is coupled to the reference voltage terminal. The transistor may be a MOSFET (metal oxide semiconductor field effect transistor). A gate of the transistor may be coupled to a controller, where the controller is configured to turn on the transistor when an input voltage to the LLC converter drops below a pre-determined threshold. The pre-determined threshold may be about 10 percent lower than a nominal low input voltage to the LLC converter. A leakage inductance of the auxiliary winding, seen by the primary side of the transformer, is smaller than a magnetizing inductance of the primary winding, in some embodiments.

In accordance with an embodiment of the present disclosure, a gate of the transistor of the LLC converter is coupled to a controller, and the controller is configured to turn on the transistor when a switching frequency of the LLC converter drops below a pre-determined threshold. A transformed leakage inductance of the auxiliary winding at the primary side is smaller than an inductance of a magnetizing inductor of the primary winding, in some embodiments. The controller is configured to turn off the transistor when the switching frequency of the LLC converter is above the pre-determined threshold, in some embodiments.

The LLC converter may further include a gate driver circuit, where the gate driver circuit is configured to turn on the transistor within a pre-determined period of time. The pre-determined period of time may range from about 1 millisecond (ms) to about 10 ms.

In some embodiments, the transformer of the LLC converter may further include a center core and a side core proximate the center core. The side core may include a plurality of fingers extending toward the center core. The auxiliary winding and the primary winding wind may around a first portion of the center core and a second portion of the center core, respectively, and there may be a first air gap between a third portion of the center core and a first finger of the plurality of fingers, the third portion being between the first portion and the second portion. The secondary winding wind may around a fourth portion of the center core, the second portion being between the third portion and the fourth portion, and there may be a second air gap between a fifth portion the center core and a second finger of the plurality of fingers, the fifth portion being between the second portion and the fourth portion. The primary winding may have a first winding portion spaced apart from a second winding portion of the primary winding, the first winding portion of the primary winding being between the auxiliary winding and the second winding portion of the primary winding. The secondary winding and the second winding portion of the primary winding may wind around a fourth portion of the center core, and there may be a second air gap between a fifth portion of the center core and a second finger of the plurality of fingers, the fifth portion being between the second portion and the fourth portion. A third finger of the plurality of fingers may contact a first end of the center core, and a fourth finger of the plurality of fingers may contact a second end of the center core.

Another general aspect of the present disclosure includes a method of operating an inductor-inductor-capacitor (LLC) converter that includes a transformer, a first diode coupled between a first end of an auxiliary winding of the transformer and a first node, a second diode coupled between a second end of the auxiliary winding and the first node, and a first switch coupled between the first node and a reference terminal. The method includes detecting that an input voltage to the LLC converter is below a pre-determined threshold, and closing the first switch to couple the first node to the reference terminal upon the detecting. In some embodiments, the closing the first switch transforms a leakage inductance of the auxiliary winding to a primary winding of the transformer, where the transformed leakage inductance is smaller than a magnetizing inductance of the primary winding. In other embodiments, the closing the first switch allows electrical current in the auxiliary winding to flow in opposite directions, thereby avoiding saturation of the magnetic core of the transformer. In some embodiments, the detecting includes detecting that a switching frequency of the LLC converter is below a pre-determined threshold. In various embodiments, the method further includes opening the first switch to de-couple the first node from the reference terminal upon detecting that the input voltage to the LLC converter is above the pre-determined threshold.

According to another aspect of the present disclosure, a power system includes an inductor-inductor-capacitor (LLC) converter that includes a switching bridge having a first plurality of switches, an LLC tank coupled to the switching bridge, the LLC tank having a first inductor, a first capacitor, and a second inductor. The LLC converter also includes a transformer coupled to the LLC tank, the transformer having a primary winding, a secondary winding and an auxiliary winding. The LLC converter further includes a first diode coupled between a first node and a first tap of the auxiliary winding, a second diode coupled between the first node and a second tap of the auxiliary winding, and a second switch coupled between the first node and a reference voltage terminal, where a third tap of the auxiliary winding between the first tap and the second tap is coupled to the reference voltage terminal. The power system further includes a controller coupled to the first plurality of switches and the second switch, where the controller is configured to adjust a switching frequency of the first plurality of switches in response to an output voltage of the LLC converter, where the controller is configured to close the second switch upon detecting that an input voltage to the LLC converter is below a pre-determined threshold.

Implementation may include one or more of the following features. In some embodiments, the controller of the power system detects that the input voltage to the LLC converter is below a pre-determined threshold by detecting that the switching frequency of the LLC converter is below a pre-determined frequency threshold. In some embodiments, the power system further includes a feedback circuit coupled between an output port of the LLC converter and the controller, where the feedback circuit is configured to provide an estimate of the output voltage of the LLC converter. In various embodiments, the LLC converter further includes a rectifier circuit coupled between the secondary winding and the output port of the LLC converter. The LLC converter may further include a second capacitor coupled between the first node and the reference voltage terminal. In some embodiments, the first diode and the second diode are configured to allow bi-directional current flow in the auxiliary winding such that saturation of the magnetic core of the transformer is avoided.

The second switch of the power system may be a MOSFET (metal oxide semiconductor field effect transistor), where a first load path terminal of the MOSFET is coupled to the first node, a second load path terminal of the MOSFET is coupled to the reference voltage terminal, and the controller is coupled to a gate of the MOSFET. The power system may further include a gate driver circuit coupled between the controller and the second switch, where an RC constant of the gate driver circuit is within a pre-determined range. The controller and the LLC converter are monolithically integrated into an integrated circuit (IC), in various embodiments.

Advantages of embodiments of the present invention include improved holdup time. By shorting the leakage inductance (e.g., turning on switch $Q_3$) to couple the transformed leakage inductance with magnetizing inductance $L_m$, a lower equivalent $L_m$ is obtained, which results in improved LLC converter gain when input voltage drops below a pre-determined threshold. When input voltage is above the pre-determined threshold, switch $Q_3$ is turned off, the LLC converter operates with higher efficiency due to a higher $L_m$ value. The disclosed LLC converter and power systems thus get the benefit of both high and low $L_m$ values under different operating conditions (e.g., different input voltage $V_{in}$). Disclosed power systems only use two diodes (e.g., diode $D_3$ and $D_4$) and one switch (e.g., MOSFET $Q_3$) for connection with the auxiliary winding, thereby providing a low-cost solution. Saturations of magnetic core is avoided by allowing bi-directional current flow in the auxiliary winding. By controlling the turns ratio between the primary winding and the auxiliary winding, switch $Q_3$ with low voltage rating (e.g., voltage rating of under 40V) can be used even with high input voltage (e.g., over 200 V).

Advantages of some embodiment transformers include reduced eddy currents within the core of the transformers, which may consequently increase the efficiency of the transformers. In some cases, embodiment transformers maintain high efficiencies without using a resonant choke. Other advantages of disclosed transformer designs include the ability to set or adjust transformer inductances by adjusting the sizes of air gaps of the transformers. Compact transformers are possible with the disclosed transformer designs.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. An inductor-inductor-capacitor (LLC) converter comprising:
    a transformer comprising a primary winding, a secondary winding, and an auxiliary winding, the primary winding coupled to a primary side circuit, the auxiliary winding having a first winding portion coupled between a first terminal and a middle terminal, and a second winding portion coupled between the middle terminal and a second terminal;
    a first diode coupled between the first terminal and a first node;
    a second diode coupled between the second terminal and the first node; and
    a switch coupled between the first node and a reference voltage terminal, a first load path terminal of the switch coupled to the first node and having a same voltage as the first node, a second load path terminal of the switch coupled to the reference voltage terminal and having a same voltage as the reference voltage terminal, the middle terminal of the auxiliary winding being coupled to the reference voltage terminal, wherein the switch is configured to stay open when an input voltage to the LLC converter is above a pre-determined threshold, and wherein the switch is configured to close upon detecting that the input voltage to the LLC converter drops below the pre-determined threshold.

2. The LLC converter of claim 1, wherein the first diode and the second diode are configured to allow electric current to flow in opposite directions in the auxiliary winding, thereby avoiding saturation of the magnetic core of the transformer.

3. The LLC converter of claim 1, further comprising a first capacitor coupled between the first node and the reference voltage terminal.

4. The LLC converter of claim 1, wherein the switch comprises a transistor.

5. The LLC converter of claim 4, wherein the transistor is a MOSFET (metal oxide semiconductor field effect transistor).

6. The LLC converter of claim 4, wherein a gate of the transistor is coupled to a controller, wherein the controller is configured to turn on the transistor when the input voltage to the LLC converter drops below the pre-determined threshold.

7. The LLC converter of claim 6, wherein the pre-determined threshold is about 10 percent lower than a nominal low input voltage to the LLC converter.

8. The LLC converter of claim 6, wherein a leakage inductance of the auxiliary winding, seen by the primary side of the transformer, is smaller than a magnetizing inductance of the primary winding.

9. The LLC converter of claim 4, wherein:
    a gate of the transistor is coupled to a controller; and
    the controller is configured to turn on the transistor when a switching frequency of the LLC converter drops below a pre-determined threshold.

10. The LLC converter of claim 9, wherein the pre-determined threshold is about 10 percent lower than a nominal low switching frequency.

11. The LLC converter of claim 9, wherein a transformed leakage inductance of the auxiliary winding at the primary side is smaller than an inductance of a magnetizing inductor of the primary winding.

12. The LLC converter of claim 9, wherein the controller is configured to turn off the transistor when the switching frequency of the LLC converter is above the pre-determined threshold.

13. The LLC converter of claim 4, further comprising a gate driver circuit, wherein the gate driver circuit is configured to turn on the transistor within a pre-determined period of time.

14. The LLC converter of claim 13, wherein the pre-determined period of time ranges from about 1 millisecond (ms) to about 10 ms.

15. The LLC converter of claim 1, wherein
the transformer further comprises a center core and a side core proximate the center core;
the side core comprises a plurality of fingers extending toward the center core;
the auxiliary winding and the primary winding wind around a first portion of the center core and a second portion of the center core, respectively; and
there is a first air gap between a third portion of the center core and a first finger of the plurality of fingers, the third portion being between the first portion and the second portion.

16. The LLC converter of claim 15, wherein
the secondary winding wind around a fourth portion of the center core, the second portion being between the third portion and the fourth portion; and
there is a second air gap between a fifth portion the center core and a second finger of the plurality of fingers, the fifth portion being between the second portion and the fourth portion.

17. The LLC converter of claim 15, wherein
the primary winding has a first winding portion spaced apart from a second winding portion of the primary winding, the first winding portion of the primary winding being between the auxiliary winding and the second winding portion of the primary winding;
the secondary winding and the second winding portion of the primary winding wind around a fourth portion of the center core; and
there is a second air gap between a fifth portion of the center core and a second finger of the plurality of fingers, the fifth portion being between the second portion and the fourth portion.

18. The LLC converter of claim 16, wherein a third finger of the plurality of fingers contacts a first end of the center core, and a fourth finger of the plurality of fingers contacts a second end of the center core.

19. A method of operating an inductor-inductor-capacitor (LLC) converter that includes a transformer, a first diode coupled between a first end of an auxiliary winding of the transformer and a first node, a second diode coupled between a second end of the auxiliary winding and the first node, and a first switch coupled between the first node and a reference terminal, a first load path terminal of the first switch connected to the first node and having a same voltage as the first node, a second load path terminal of the first switch connected to the reference terminal and having a same voltage as the reference terminal, the method comprising:
keeping the first switch open when an input voltage to the LLC converter is above a pre-determined threshold;
detecting that the input voltage to the LLC converter is below the pre-determined threshold; and
closing the first switch to couple the first node to the reference terminal upon the detecting.

20. The method of claim 19, wherein the closing the first switch transforms a leakage inductance of the auxiliary winding to a primary winding of the transformer, wherein the transformed leakage inductance is smaller than a magnetizing inductance of the primary winding.

21. The method of claim 20, wherein the closing the first switch allows electrical current in the auxiliary winding to flow in opposite directions, thereby avoiding saturation of the magnetic core of the transformer.

22. The method of claim 19, wherein the detecting comprises detecting that a switching frequency of the LLC converter is below a pre-determined threshold.

23. The method of claim 19, further comprising opening the first switch to de-couple the first node from the reference terminal upon detecting that the input voltage to the LLC converter is above the pre-determined threshold.

24. A power system comprising:
an inductor-inductor-capacitor (LLC) converter comprising:
a switching bridge comprising a first plurality of switches;
an LLC tank coupled to the switching bridge, the LLC tank comprising a first inductor, a first capacitor, and a second inductor;
a transformer comprising a primary winding, a secondary winding and an auxiliary winding, wherein the primary winding is coupled to the LLC tank, and the secondary winding is coupled to an output port of the LLC converter;
a first diode coupled between a first node and a first tap of the auxiliary winding;
a second diode coupled between the first node and a second tap of the auxiliary winding; and
a second switch coupled between the first node and a reference voltage terminal, wherein a first load path terminal of the second switch is coupled to the first node and having a same voltage as the first node, and a second load path terminal of the second switch is coupled to the reference voltage terminal and having a same voltage as the reference voltage terminal, wherein a third tap of the auxiliary winding between the first tap and the second tap is coupled to the reference voltage terminal; and
a controller coupled to the first plurality of switches and the second switch, wherein the controller is configured to adjust a switching frequency of the first plurality of switches in response to an output voltage of the LLC converter, wherein the controller is configured to close the second switch upon detecting that an input voltage to the LLC converter is below a pre-determined threshold.

25. The power system of claim 24, wherein the controller detects that the input voltage to the LLC converter is below a pre-determined threshold by detecting that the switching frequency of the LLC converter is below a pre-determined frequency threshold.

26. The power system of claim 24, further comprising a feedback circuit coupled between the output port of the LLC converter and the controller, wherein the feedback circuit is configured to provide an estimate of the output voltage of the LLC converter.

27. The power system of claim 24, wherein the LLC converter further comprises a rectifier circuit coupled between the secondary winding and the output port of the LLC converter.

28. The power system of claim 24, wherein the LLC converter further comprises a second capacitor coupled between the first node and the reference voltage terminal.

29. The power system of claim 24, wherein the second switch is a MOSFET (metal oxide semiconductor field effect transistor), and the controller is coupled to a gate of the MOSFET.

30. The power system of claim 29, further comprising a gate driver circuit coupled between the controller and the second switch, wherein an RC constant of the gate driver circuit is within a pre-determined range.

31. The power system of claim 24, wherein the controller and the LLC converter are monolithically integrated into an integrated circuit (IC).

32. The LLC converter of claim 1, wherein the secondary winding is coupled to an output terminal of the LLC converter.

\* \* \* \* \*